United States Patent [19]

McDonald

[11] Patent Number: 4,713,830
[45] Date of Patent: Dec. 15, 1987

[54] CONTINUOUSLY VARIABLE SYNCHRONIZER APPARATUS

[75] Inventor: Mark A. McDonald, Garland, Tex.

[73] Assignee: Rockwell International Corporation, El Segundo, Calif.

[21] Appl. No.: 880,470

[22] Filed: Jun. 30, 1986

[51] Int. Cl.$^4$ .......................... H04L 7/00; H03D 3/24
[52] U.S. Cl. .................................. 375/109; 375/120; 455/69
[58] Field of Search .............................. 375/109, 120; 340/870.42; 455/69; 371/34

[56] References Cited

U.S. PATENT DOCUMENTS

| 3,128,465 | 4/1964 | Brilliant | 455/69 |
| 3,588,703 | 6/1971 | Sorkin et al. | 375/109 |
| 4,535,459 | 8/1985 | Hogge, Jr. | 375/80 |
| 4,602,375 | 7/1986 | Inukai | 375/109 |
| 4,628,461 | 12/1986 | Adams | 375/120 X |

Primary Examiner—Stephen C. Buczinski
Assistant Examiner—Linda J. Wallace
Attorney, Agent, or Firm—Bruce C. Lutz; V. L. Sewell; H. Fredrick Hamann

[57] ABSTRACT

A system is illustrated for making sure that received data and the master clock are in the proper relationship even though temperature, voltage supplies and aging cause variable transmission time delays between the source of data and the local circuit. This proper relationship is accomplished by detecting the phase difference between a local master oscillator and the received data and providing a clock signal to be used by the remote data sending device in a system phase-locked loop using a slave oscillator and the previously mentioned phase detection circuit. The slave oscillator tracks the frequency of the master oscillator and the phase of the incoming data. Since a clock signal was previously required for prior art systems, this approach eliminates the return clock that was required if the cable length and the associated data signal delay parameters could vary.

5 Claims, 1 Drawing Figure

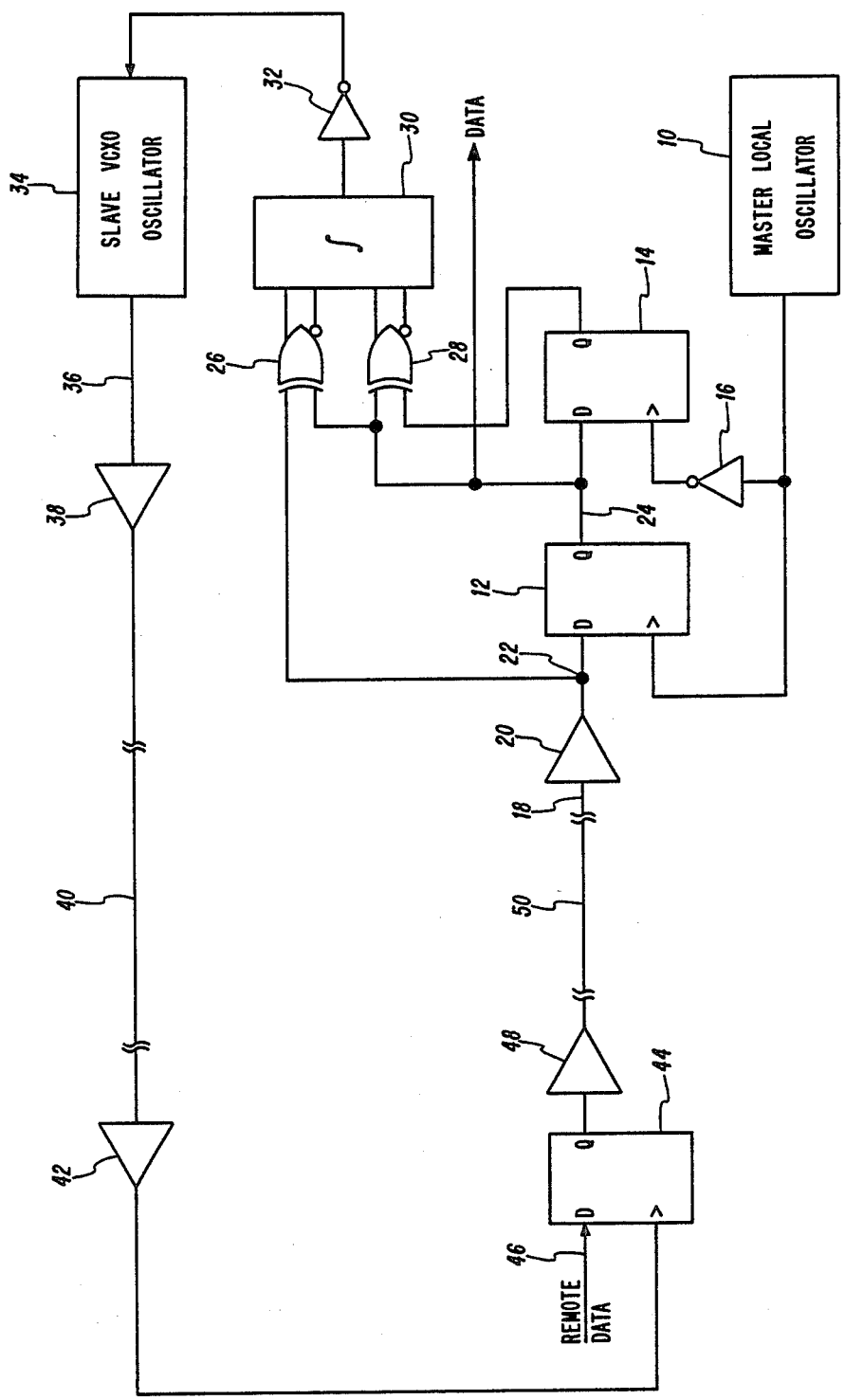

CONTINUOUSLY VARIABLE SYNCHRONIZER APPARATUS

THE INVENTION

The present invention is generally related to electronics and more specifically related to data transfer between a remotely situated circuit and a local circuit. Even more specifically, it is related to the situation where various parameters can cause a received data bit to vary in time more than the time between consecutive clock signal pulses.

BACKGROUND

In prior art low frequency circuits, the variation of data bits relative a local oscillator typically was not great enough to cause problems as long as the cable length was of a substantially fixed value. As the frequency of data being transferred rose, and especially if cable lengths between remote and local circuits were great enough or varied, means had to be designed for keeping the frequency of a remote data source tied to the frequency of the local clock and arrangements needed to be made so that the clocking of data at the local source always coincided in a given window with the local clock such that bit errors did not occur due to violation of set up and hold time specifications of local circuits.

One approach used in the prior art was to transmit a clock from the local source to the remote source for use in clocking the data signal. Both the data signal and the clock at the remote source were then returned to the local source, thus requiring three transmission lines. Both the returned clock and the returned data transmission lines needed to be of substantially identical length, otherwise temperature and other parameters could still cause timing problems. The returned clock would then be used in the local circuit for further data processing.

The present invention adds a further slave oscillator and phase detection circuit but eliminates the expense of a third transmission line by having the slave oscillator, which comprises a part of a phase lock loop that operates in frequency the same as a local master oscillator and holds a phase relative incoming data to an amount, such that the local master clock is continuously and automatically centered relative the incoming data.

It is thus an object of the present invention to provide an improved data synchronizing circuit.

BRIEF DESCRIPTION OF THE DRAWING

Other objects and advantages of the present invention will be apparent from a reading of the specification and appended claims in conjunction with the single drawing which illustrates a combination schematic block diagram of the variable synchronizer present inventive concept.

DETAILED DESCRIPTION

In the drawing a master local oscillator 10 is shown supplying clock signals to a first D flip-flop 12 and also to a second D flip-flop 14 after being inverted in an inverter 16. Data is supplied from a local input 18 through an isolating amplifier or network 20 to an input 22 of D flip-flop 12. An output of D flip-flop 12 is supplied on a lead 24 to a D input of flip-flop 14.

The signals on leads 22 and 24 are both supplied to an exclusive OR gate 26 while the signal on lead 24 and a signal on an output of D flip-flop 14 are both supplied to an exclusive OR gate 28. The data signal on lead 24 comprises output data which can be used by the remaining local circuitry. An integrating circuit 30 is connected to receive the outputs of the two exclusive OR gates 26 and 28 and, after integration is supplied through an isolating and inverting amplifier 32 to an input of a slave voltage controlled oscillator 34. The amplitude of the receive signal by oscillator 34 affects the frequency and, as a natural extension, also affects the phase of the output signal. The output signal of oscillator 34 is supplied on a lead 36 to an isolation circuit 38. The output of 38 is transmitted over a transmission line of unknown cable length 40 to the input of a further isolating circuit 42. The output of isolating circuit 42 is used to clock a D flip-flop 44 at the remote location associated with isolating means 42. A data signal is supplied on a lead 46 to a D input of the D flip-flop 44. Outputs from the remote location are supplied from an output of D flip-flop 44 through an isolating circuit 48 and then to a data return line 50 of unknown length. The cable 50 is connected to the input 18 previously mentioned.

OPERATION

The D flip-flops 12 and 14 in combination with the exclusive OR gates 26 and 28, the integrator 30, and the oscillator 34 comprise a substantial portion of a phase detection apparatus as illustrated in U.S. Pat. No. 4,535,459 issued to Charles Hogge, Jr., and assigned to the same assignee as the present invention. While any phase detector can be used to detect two signals, one of which has random transitions at integer time interval points, the detector of the referenced patent operates in accordance with the desired objectives and more detailed information as to the phase detector portion can be obtained therefrom.

In operation the data is supplied from the remote source illustrated by D flip-flop 44 at a time interval associated with the clock input applied to the clock terminal (>) of D flip-flop 44. After passing through transmission means 50, data is supplied to an input of D flip-flop 12 as well as to one input of exclusive OR gate 26. An output does not appear from D flip-flop 12 until the next occurrence of a clock from oscillator 10. Until an output is provided from D flip-flop 12 on lead 24, the exclusive OR gate 26 provides an output to integrator 30. If the clock from oscillator 10 is not centered within the data bit supplied to D flip-flop 12, the output from exclusive OR gate 26 will be of a different width than that supplied from exclusive OR gate 28 as a result of the data signals being further passed through D flip-flop 14. This will result in a variation in amplitude output by integrator 30 so as to change the frequency of oscillator 34. The change of frequency of oscillator 34 will adjust the actuation time of the clock signal being returned to the clock input of D flip-flop 44 at the remote location to thereby adjust the timing of the data being received by D flip-flop 12 until the clock from oscillator 10 occurs exactly at the center of the data pulse. At this point the phase lock loop comprising the phase detector incorporating D flip-flops 12 and 14 and oscillator 34 as well as the two data transmission channels 40 and 50 and the remote D flip-flop 44 will be in a balanced or stable condition and the oscillator 10 will then be synchronized with the data on lead 24 supplied to the remaining circuitry. This of course is the desired function of the present invention. As mentioned previously, by using this approach, the clock output of the master oscillator 10 is automatically centered within the data and one less transmission line is required than in one of the prior art approaches. The loop is thus self-correcting and auto-centering. Any drift in frequency of the slave oscillator is compensated for and any change in phase of the incoming data is compensated for. Reliable data transfer is thus guaranteed over temperature, power supply variations, and device aging.

The auto-centering capability also allows the overall circuit to compensate for any additional delays that might be inserted into the transmission path such as substituting a protection channel for the original channel as often occurs when faults are detected in the original channel. The auto-centering feature also eliminates requirements for customized cabling that were often required in prior art solutions for inter-connecting the remote and local circuit.

One embodiment of the present invention was used for data transfer occurring at 565 megahertz but there is no reason why it cannot operate at much higher frequencies than that.

While I have illustrated a specific embodiment of the inventive concept, I wish to be limited not by the embodiment shown but only by the scope of the appended claims wherein I claim:

1. Clock signal synchronizer apparatus for use with a system for transmitting data between data source and data receiving remote locations where the data transmission distance and data frequency is such that data cannot be transmitted reliably over a normal range of system parameter variations comprising in combination:

master oscillator means at said data receiving location for supplying master clock signals;
   slave variable frequency oscillator means at said data receiving location, including control input means and signal output means, for supplying an output clock signal to said data source the frequency and phase of which is adjusted in response to a control input signal;
   data means for supplying a data signal received from the data source location; and
   phase detector means, including first input means connected to receive data signals from said data means, second input means connected to said master oscillator means for receiving clock signals therefrom and control signal output means connected to said control input means of said slave means for supplying control signals thereto, the slave means, data means and a means at said data source receiving the output clock signals forming a phase locked loop.

2. The method of compensating for variable transmission line time delays in received data comprising the steps of:
   receiving data from a remote location;
   generating a local master clock signal;
   detecting the phase difference between said local master clock signal and received data;
   adjusting the frequency of a clock output of a local slave oscillator in accordance with the detected phase difference; and
   supplying the clock output of the local slave oscillator to the remote location for use in correctly timing the output of data from said remote location.

3. Apparatus for compensating for variable transmission line time delays in received data comprising, in combination:
   first means for receiving data from a remote location;
   second means for generating a local master clock signal;
   third means, connected to said first and second means, for receiving the remote data and master clock signals therefrom and for outputting a master clocked local data signal;
   fourth means, connected to said third means, for detecting the phase difference between the master clocked local data signal and the received remote data and outputting control signals in accordance with the detected difference;
   local slave oscillator fifth means, connected to said fourth means for receiving said control signals therefrom, the frequency of a clock output of said oscillator fifth means changing in accordance with the detected phase difference; and
   sixth means for supplying the clock output of the local slave oscillator fifth means to the remote location for use in correctly timing the output of data from said remote location.

4. The method of timing data output at a remote location with respect to a local master oscillator where the factors affecting the time delay of the data signal being transmitted are variable comprising the steps of:
   generating a phase locked local clock signal whose frequency and timing are a function of the phase difference between data received from a remote location and the phase of a local master clock signal; and
   transmitting the phase locked local clock signal to the remote location for use in timing the output of data to be returned to the local system.

5. Apparatus for compensating for variable time delays in data being transmitted in a system from a remote location to a local circuit comprising:
   first means at a remote location for outputting a data signal in accordance with a first clock signal;
   second means, comprising part of a local circuit, for generating a master clock signal;
   third means, comprising part of a local circuit and connected to said second means, for receiving data from the first means at the remote location and outputting locally master clocked data;
   slave oscillator fourth means, connected to said third means, for receiving the received data and the locally master clocked data therefrom, and for outputting a slave output signal whose frequency is a function of the phase difference between the received and locally master clocked data signals; and
   fifth means connecting said first, third and fourth means in a phase locked loop configuration for maintaining a predetermined relationship between the master clock signal and the master clocked data signals.

* * * * *